United States Patent [19]
Jessop et al.

[11] Patent Number: 5,425,033
[45] Date of Patent: Jun. 13, 1995

[54] DETECTION OF ERRORS IN A DIGITAL TRANSMISSION SYSTEM

[75] Inventors: Anthony Jessop, Harlow; Ian J. Hirst, London, both of United Kingdom

[73] Assignee: Northern Telecom Limited, Montreal, Canada

[21] Appl. No.: 4,437

[22] Filed: Jan. 14, 1993

[30] Foreign Application Priority Data

Jan. 31, 1992 [GB] United Kingdom ............... 9202085

[51] Int. Cl.$^6$ .................................. G06F 11/10
[52] U.S. Cl. ................................ 371/5.1; 371/5.2; 371/49.2; 375/292
[58] Field of Search .......... 371/5.1, 5.2, 57.1, 371/49.2, 57.2; 375/3, 19

[56] References Cited

U.S. PATENT DOCUMENTS

| | | | |
|---|---|---|---|
| 3,646,517 | 2/1972 | Waters et al. | 371/57.1 |
| 4,121,195 | 10/1978 | Jessop | 375/19 X |
| 4,234,954 | 11/1980 | Lange et al. | 371/5.1 X |
| 4,367,550 | 1/1983 | Douverne | 371/5.2 |
| 4,387,460 | 6/1983 | Boutmy et al. | 375/19 X |
| 4,428,076 | 1/1984 | Schuon | 371/5.1 |
| 4,507,783 | 3/1985 | Austin et al. | 371/49.2 |
| 4,573,045 | 2/1986 | Galin | 371/57.1 X |
| 4,710,976 | 12/1987 | Wakabayashi et al. | 455/601 |

FOREIGN PATENT DOCUMENTS 1536337 6/1976 United Kingdom .

Primary Examiner—Ellis B. Ramirez
Assistant Examiner—Eric W. Stamber
Attorney, Agent, or Firm—Lee, Mann, Smith, McWilliams, Sweeney & Ohlson

[57] ABSTRACT

An error detecting arrangement for a digital transmission line, wherein signals are transmitted in the form nBIP, and which also provides the possibility of signal validation and a signalling channel. The output of a toggle (4) has a line spectrum at $fo/2(n+1)$ or $fo/(n+1)$, where fo is the line digit frequency, depending on whether the parity is odd mark or even mark. The toggle output is bandpass filtered (at 5) as appropriate and applied to envelope detector (6). Errors can be counted (at 10). The envelope detector output is low pass filtered (at 7), the output of which is an analogue measure of the error rate. The latter is compared (at 9) with a threshold BER and the result can be used for validation or providing a signalling channel (FIG. 2).

7 Claims, 1 Drawing Sheet

DETECTION OF ERRORS IN A DIGITAL TRANSMISSION SYSTEM

BACKGROUND OF THE INVENTION

This invention relates to error detection for digital transmission systems and in particular to error detection in submerged repeater supervisory systems.

In our British Patent Specification No. 1536337 (the contents of which are incorporated herein by reference) (corresponding to U.S. Pat. No. 4,121,195) is described a simple parity violation detector for detecting line errors in particular at a repeater.

According to claim 1 of Specification No. 1536337 there is provided an error detecting arrangement for a digital transmission line system over which constant accumulated disparity signals are transmitted, including at a transmitter means for modifying the signals for transmission at intervals whereby the transmitted signals contain special signals the digital values of which reflect the parity of predetermined digital signal events in the immediately preceding intervals, the special signals themselves having values which maintain the overall constant accumulated disparity of the transmitted signals, means at a subsequent point in the system for counting the predetermined digital signal events in the transmitted signals and means for determining a change in the dc content of the counting means output.

The same detector may also be used to receive information transmitted by intentionally violating parity i.e. for supervisory purposes. In a particular case of the known detector an extra bit is added to a scrambled data stream by digital multiplexing so that following n consecutive scrambled data bits there is one parity bit. Typically this comprises a 24B1P (nB1P or n binary data bits and one parity bit) line code, that is for every 24 binary data bits transmitted to line a 25th bit is added such that the 25 bit word has even mark parity. The parity bit is used to control the parity of each (n+1) bit block. In the known detector illustrated in FIG. 1, non return to zero (NRZ) data 1 and clock 2 are summed together at 3 to produce return to zero (RZ) pulses, a divide by two counter 4 (toggle) is caused to toggle on each received mark (or alternatively each received space). If the (n+1) bit blocks are coded to have even mark parity, then in the event of no errors, the output of the counter 4 will be in the same state immediately after each parity bit. In the event of a violation of even parity within a block, either by an odd number of errors occurring or by intentionally using the parity bit to make the block have odd parity, then the output of the counter 4 immediately after the parity bit will be in the opposite state to that immediately after the previous parity bit and the counter output will continue to take up this new state after each subsequent even mark parity block.

The output of the binary counter 4 has three components. Firstly a random component due to the scrambled data which at low frequencies [<fo/4, where fo is the line digit frequency (bit rate)] has a substantially flat power spectral density, secondly a dc component due to the parity bit and thirdly a line spectrum also due to the parity bit. The information in the parity bit, be it line errors or a low speed data channel, can be separated from the background noise such as by low and band pass filters 7 and 5 respectively. Line errors are detected by a change in dc level detector 7a.

A practical difficulty with such an arrangement is that the bias produced is small and necessitates dc amplifiers with small offsets and low drift rates with temperature and aging. Another drawback is that at high error rates the bias changes become too rapid to pass through the low pass filter, resulting in no bias. The noise level that is present (energy in the bandwidth of the filter) is small and a very small offset will stop the threshold level of the counter being crossed and hence no errors will be detected in that case. Thus at high BERs (Bit Error Rates) the error detector cannot reliably tell if there are any errors at all.

One method of creating a low speed data channel is to intentionally violate even parity at a fixed frequency. A low speed signalling channel is thus created by switching the frequency on and off and detecting this at a repeater by a suitable filter tuned to the frequency, and for example demodulator (envelope detector) 6. In other words, periodic parity bit violations at a low rate produce a tone which can be used as a carrier for supervisory commands.

A modification to improve the high BER indication is to superimpose a triangular waveform on to the level detector input such that at high error rates the triangular waveform provides the threshold crossings, while at low or zero BERs the bias offset holds the triangular waveform away from the threshold. A particular triangular waveform we have employed is $\frac{1}{4}$ of the bias change. However this modification cannot be guaranteed to function under all BER conditions as on some regenerators, unexplained offsets have been generated at very high BERs, such as with broken fibre and no light, causing the triangular waveform not to cross the threshold and hence no error indication.

SUMMARY OF THE INVENTION

According to the invention there is provided an error detecting arrangement for a digital transmission line system over which constant accumulated disparity signals are transmitted. Means are provided at a transmitter for modifying the signals for transmission at intervals whereby the transmitted signals are in the form nB1P (n binary data bits and one parity bit) and contain special signals the digital values of which reflect the parity of predetermined digital signal events in the immediately preceding intervals. The special signals have values which maintain the overall constant accumulated disparity of the transmitted signals. The predetermined digital signal events in the transmitted signals are counted at a subsequent point in the system. Changes in the line spectra at fo/2(n+1) or fo/(n+1), where fo is the line digit frequency, are determined from the count.

BRIEF DESCRIPTION OF THE DRAWINGS

Embodiments of the invention will now be described with reference to FIGS. 2 and 3 of the accompanying drawings, in which.

DESCRIPTION OF THE PREFERRED EMBODIMENTS

Figure 1:
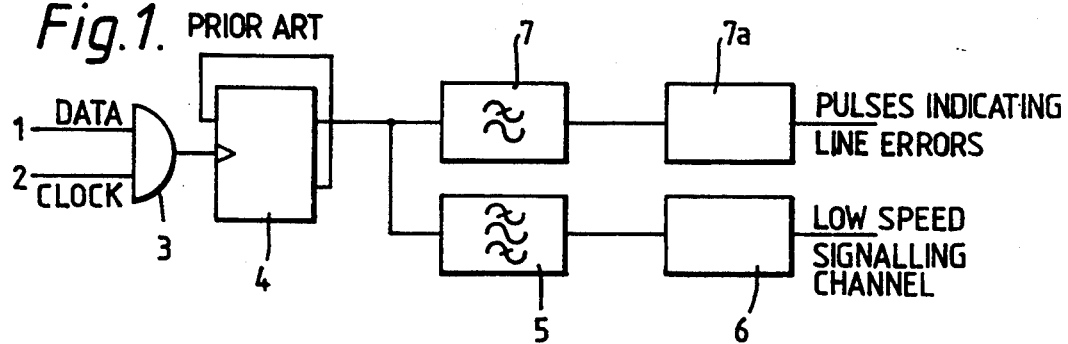
FIG. 1 illustrates a prior art error detector.
Figure 2:
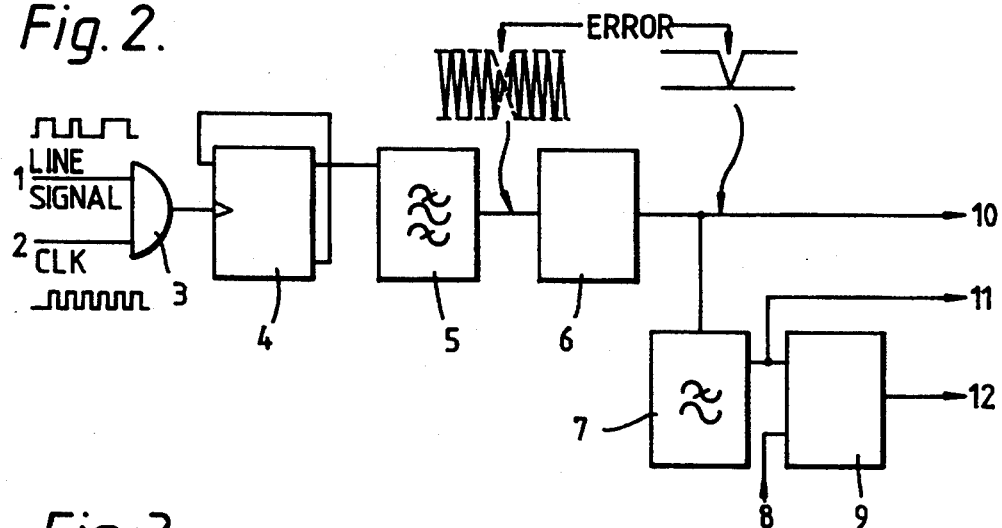
FIG. 2 illustrates a first embodiment which is an alternative form of error detector to that described with respect to FIG. 1.

The error detector of FIG. 2 will now be described. As mentioned above, at the output of the counter 4, there must be a frequency component at the bit rate fo/(n+1), due to the n+1 bit always being in the same state, assuming there have been no errors. This frequency can be extracted from the random noise of the random data stream by bandpass filter 5 and then rectified by an envelope detector 6 to give a steady dc signal.

If there is a single error, the state of the (n+1)th bit is inverted (equivalent to a phase shift of 180°) and subsequent (n+1) bits remain inverted. Due to the memory of the filter 5, the output signal must decay to zero and then recover, the time taken depending on the bandwidth. Thus each isolated error will produce an interruption in the signal out of the filter 5. By using an envelope detector 6, these interruptions can be formed into glitches (pulses) output at 10 for error counting by a counter (not shown). When using an odd mark parity (inverted line signals or when using odd mark parity encoded line signals) the frequency from the binary counter is halved because alternate (n+1) bits are inverted. In a similar fashion to the even mark parity detector, subsequent (n+1) bits after an error are inverted with respect to their state before the error. The band pass filter 5 is centered at fo/(n+1) for even mark parity and fo/2(n+1) for odd mark parity.

As the BER increases, the frequency of the interruptions increases. These interruptions (180° shifts) redistribute the energy of the signal away from the bit rate frequency fo/n+1, which is equivalent to phase modulating a carrier randomly by 180°. Thus the signal level out of the filter 5 will fall as the power is transferred from the carrier to the sidebands and the filter rejects these sidebands. As the BER rises still further, the pulses from the envelope detector 6 will merge and the mean dc signal will fall until eventually only the rectified residual noise of the random bit stream is left.

Figure 3:
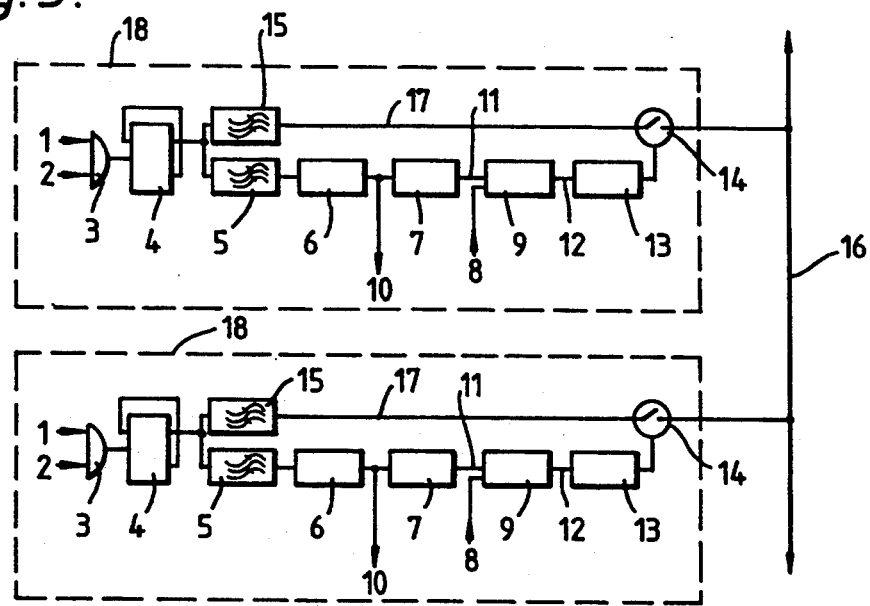
FIG. 3 illustrates another embodiment of inventive error detector.

Thus the output of the envelope detector 6 has ac and dc components. These components can be used in a number of ways. The ac and dc components output together at 10 provide a source of pulses which when fed to a counter enables errors in the line signal to be counted. The dc component, at 11, following low pass filter 7, is governed by the mean BER and provides an analogue signal of the BER. By comparing this dc component with a reference dc voltage 8 in a comparator (threshold device) 9, a signal is output at 12 which can be switched by the injection or not of sufficient errors to cross the threshold rate X (for example "1" at BER<X, "0" if BER>X). This can be used as a means for providing a signalling channel or as a signal validator, as described hereinafter with reference to FIG. 3. The threshold device can, for example, provide a binary output corresponding to no errors [or low BER<1×10$^{-6}$] or high error rate [pseudo errors BER>1×10$^{-3}$] which can be used for signalling purposes. It should be noted that the counter can be switched off from the transmitter end of the system by changing the parity encoding at the transmitter between even and odd mark parity. If the counter is set to count odd mark parity, then switching to even mark parity switches the counter off, and vice versa.

For the envelope detector not to degrade the snr (signal to noise rate), the input snr must be greater than 20 dB and it then has a similar performance to a synchronous detector. It should be noted that the bandwidth of the detector should be very much greater than that of the filter in order that the detector output is not smoothed. The following is a snr calculation for the band pass filter (5) of FIG. 2.

The noise power due to random binary NRZ signals at frequencies very much less than bit rate is:
  Noise power $\approx$ BW [n/(n+1)]$^2$/(2f) watts
  Peak signal power $\approx$ 1/(n+1)$^2$ watts
    where f=bit rate
    n=number of bits which set the parity bit
    BW=bandwidth of filter The snr=peak signal/noise=29.4 dB for n=24, f=2.6 GHz, BW=10400 Hz, odd mark parity detection assuming 1 volt peak to peak pulses in a 1 ohm impedance.

In the case of a failed transmission system some repeaters may generate spurious low frequency bursts of pulses which may be interpreted as erroneous messages and where more than one such channel (18—FIG. 3) is connected to a data bus (16—FIG. 3), the spurious bursts may corrupt genuine data from the other channels. A method for checking that the received signal is a genuine one (signal validator), in that it contains parity information, will now be described with reference to FIG. 3. Now, the parity bits (if present) occur regularly, hence in the error detection mode when continuous even mark parity is used, there will be a frequency component (line spectra component) in the output of the counter 4 at fo/(n+1), where fo is the line digit frequency (bit rate), which produces a logic high ("1") state at 12. This maintains a retriggerable monostable 13 in its high state which sets the switch 14 to the closed "through" position. If the BER becomes larger than the threshold level or the parity bit is missing (optical path broken), then the output comparator 9 changes to logic level "0", forcing the retriggerable monostable 13 also to logic level "0", after its delay period, thus opening switch 14. In this manner no signal can reach the bus 16 via that channel 18. Similarly, if there is odd mark parity there will be a line spectra component at fo/2(n+1) and the circuit will operate correspondingly.

When signalling is started by means of parity bit violations at a rate of 2 fs, then band pass filter 15 which is tuned to fs passes this frequency generated by the toggle 4 to the switch 14 for transmission on to the bus 16. The parity bit violations will move the power due to the parity bit into the stop band of filter 5 and hence the output of comparator 9 will change state to logic level "0". After the delay period of the retriggerable monostable 13, its output changes state and switch 14 is opened, so that the signal from filter 15 can no longer reach bus 16 on line 17. The delay of the retriggerable monostable 13 is set slightly greater than the time to transmit a supervisory message and removes the need for the frequency fs to be so low that it cannot move the parity bit power into the stop band of filter 5.

As will be appreciated from the above description the invention thus provides error detection based on the line spectrum produced by the parity bit and also provides an in-service optical repeater supervisory system which utilises the line spectrum caused by the parity bit after modulo-2 division to provide error detection, signal validation and a signalling channel at an optical repeater embedded in a repeatered line.

The error detection method of the present invention, which is based on the line spectrum produced by the parity bit rather than the dc component as in the prior art, enables error information to be provided for higher BERs than the prior art method.

We claim:

1. An error detecting arrangement for a digital transmission line system over which constant accumulated disparity signals are transmitted, including at a transmitter means for modifying the signals for transmission at intervals whereby the transmitted signals are in the form nB1P (n binary data bits and one parity bit) and contain special signals having digital values which reflect the parity of predetermined digital signal events in immediately preceding intervals, the special signals themselves having values which maintain an overall constant accumulated disparity of the transmitted signals, means for counting at a subsequent point in the system the predetermined digital signal events in the transmitted signals, and means for determining a change in line spectra at $fo/2(n+1)$ or $fo/(n+1)$ where of is the line digit frequency at an output of the counting means, wherein said determining means comprises a first band pass filter centered at $fo/2(n+1)$ or $fo/(n+1)$ and followed by an envelope detector having an output waveform containing a respective pulse for each error which pulses can be counted by said counting means, and wherein the output waveform of the envelope detector is applied to a low pass filter whereby to obtain a mean dc signal corresponding to an analogue measurement of an error rate.

2. An arrangement as claimed in claim 1 wherein the mean dc signal is applied to a threshold device which has an output when a bit error rate exceeds a predetermined value.

3. An arrangement as claimed in claim 2 wherein the threshold device provides a binary output corresponding to no errors (or low bit error rate $<10^{-6}$) or high error rate (psuedo errors bit error rate $>1\times10^{-3}$) which can be used for signalling purposes.

4. An arrangement as claimed in claim 2 wherein the output of the threshold device is used to provide a validation signal for signalling, which signalling employs the low frequency content of the output of the counting means.

5. An arrangement as claimed in claim 4 wherein the output of the counting means is applied to a second bandpass filter centered at half the frequency of parity bit violations employed for signalling, the output of the second bandpass filter being applied to a switch which is controlled by threshold device output and which output is transmitted through the switch for signalling purposes when validated.

6. An arrangement as claimed in claim 5 wherein the output of the threshold device is applied to a retriggerable monostable which serves to control the switch.

7. An arrangement as claimed in claim 1 wherein the counting means is switched off from the transmitter means by changing parity encoding at the transmitter means between even and odd mark parity.

* * * * *